United States Patent [19]
Choi

[11] Patent Number: 5,685,425
[45] Date of Patent: Nov. 11, 1997

[54] CD BOX WITH T-SHAPE CLAMPING ELEMENTS

[75] Inventor: King Yeung Choi, Hong Kong, Hong Kong

[73] Assignee: Viva Magnetics Limited, Hong Kong, Hong Kong

[21] Appl. No.: 602,373

[22] Filed: Feb. 16, 1996

[30]      Foreign Application Priority Data

Feb. 16, 1995 [DE] Germany ................. 19505230.7

[51] Int. Cl.⁶ ............................................ B65D 85/57
[52] U.S. Cl. .................. 206/310; 206/308.1; 206/493
[58] Field of Search ............................. 206/308.1, 307, 206/308.3, 309, 310, 311, 312, 493

[56]          References Cited

U.S. PATENT DOCUMENTS

| 4,535,888 | 8/1985 | Nusselder . | |
|---|---|---|---|
| 5,244,085 | 9/1993 | Lammerant et al. | 206/308.1 |
| 5,284,243 | 2/1994 | Gelardi et al. | 206/308.1 |
| 5,322,162 | 6/1994 | Melk | 206/308.1 |
| 5,477,960 | 12/1995 | Chen | 206/308.1 |
| 5,515,968 | 5/1996 | Taniyama | 206/310 |

FOREIGN PATENT DOCUMENTS

| 0515342 | 11/1992 | European Pat. Off. . | |
|---|---|---|---|
| 0608822 | 8/1994 | European Pat. Off. . | |
| 2261210 | 5/1993 | United Kingdom . | |
| 88006559 | 9/1988 | WIPO | 206/308.1 |

*Primary Examiner*—Paul T. Sewell
*Assistant Examiner*—Luan K. Bui
*Attorney, Agent, or Firm*—Birch, Stewart, Kolasch & Birch, LLP

[57]          ABSTRACT

A disk receiving device for a storage cassette having a front covering part, a rear covering part and a disk receiving plate, for circular information disks, wherein on both sides of the disk receiving plate protruding T-shaped clamping elements are provided for clamping the circular information disks in the center hole of the information disks. The T-shaped clamping elements are disposed around a central opening in the disk receiving plate, comprising a base portion and two clamping portions integral with the basis portion. The T-shaped clamping elements extend vertically from the base portion in such a manner that the clamping portions protrude on both sides of the disk receiving plate essentially in a vertical direction relative to the disk receiving plate.

13 Claims, 7 Drawing Sheets

CD BOX WITH T-SHAPE CLAMPING ELEMENTS

FIELD OF THE INVENTION

The invention refers to a disk receiving device for a storage cassette comprising of a front covering part, a rear covering part and a disk receiving plate, for circular information disks, wherein on both sides of said disk receiving plate protruding clamping means are provided, for clamping the circular information disks at the edge of the central hole of the information disk.

BACKGROUND OF THE INVENTION

A disk receiving device of this kind is known, for example, from DE-A 42 25 784. Such a disk receiving device is used for receiving two information disks like compact disks and other optical storage disks in a storage cassette, its outer dimensions not exceeding those of a storage cassette for a single information disk. Hereby, the front and the rear covering part are pivotably connected along an edge of the storage cassette, and also the disk receiving plate is pivotably hinged near or at an edge of the storage cassette. The front and the rear covering part are formed in a manner that with closed storage cassette the disk receiving plate is practically completely enclosed. The storage cassette may be opened or closed similar to a book to alternatively make accessible one of the information disks or to store it dust-protected within the storage cassette. For holding the information disks holding sections are provided around the central opening of the disk receiving plate, extending radially inwardly, each having the shape of an L, their free ends hereby protruding from the front or from the back of the disk receiving plate and a arranged alternating along the edge. The holding sections are flexible to hold the information disks safely, after they have been pushed onto the respective group of holding sections.

A further disk receiving device of the above mentioned type is known from EP-A 0 492 421 and from the equivalent DE-U 89 15 977. Also in this case the clamping elements of the disk receiving plate are arranged alternately around the central opening in a way, that the clamping elements extend alternately upwardly and downwardly.

SUMMARY OF THE INVENTION

Another way to secure two information disks to a disk receiving device is by a disk receiving device having the features of patent claim 1. Further structural details are subject of the dependent claims.

According to the invention, T-Shaped clamping elements are disposed around a central opening in the disk receiving plate, comprising a base portion and two clamping portions integral with the basis portion and extending vertically from the base portion in such a manner that the clamping parts protrude on both sides of the disk receiving means essentially in vertical direction thereto. The realization of the holding means for the information disks provides, according to the invention, in parallel to the pure mechanical aspects the additional advantage that an attractive optical design can be achieved for the disk receiving device.

Therefore, on the one hand, it may be considered that the base portions of the clamping elements are fixed to the circumference of the central opening as it is common with clamping elements according to the state of the art.

Referring to a preferred embodiment of the invention, however, within the central opening of the disk receiving plate a ring is provided to which the base portions of the clamping elements are fixed.

On the one hand, to underline the new optical effect, but also on the other hand, to protect the sensitive clamping elements against rough treatment by accidents, it may be considered that at least on one side of the clamping elements ribs are provided which extend radially in relation to the central opening along the base portion and which terminate in front of the clamping parts.

Thereby, it is advantageous to consider one rib on each side of each clamping element on both sides of the disk receiving plate.

It is suitable to fix the ring that is arranged in the middle of the central opening, at the circumference of the central opening via a plurality of braces. At the same time the braces may serve as a support for the ribs.

Especially advantageous, the clamping parts comprise at their free ends angular offset protrusions that take care for a safe holding of the posed information disk.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

In the following the invention is explained by an example of an embodiment that is shown in the attached drawing, wherein.

DESCRIPTION OF THE PREFERRED EMBODIMENTS

Figure 1:
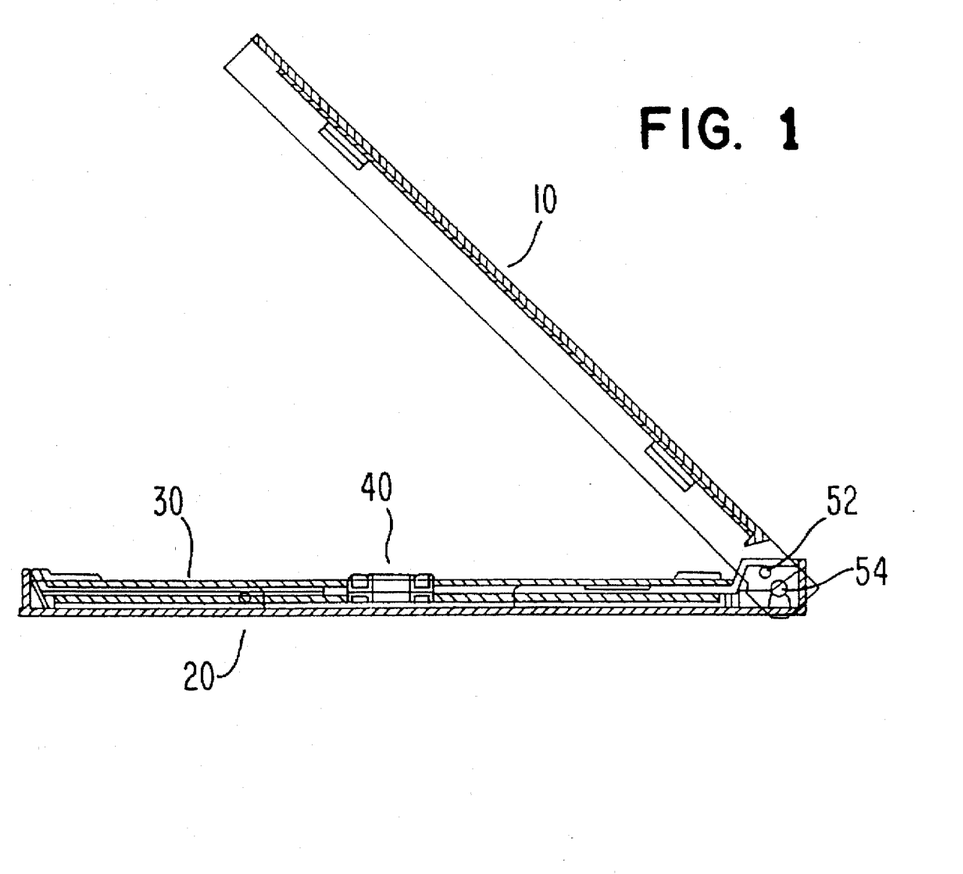
FIG. 1 is a sectional view of a storage cassette comprising a disk receiving device according to the present invention with a lifted front covering part.

FIG. 1 shows a sectional view of a storage cassette for two information disks such as compact disks or the like which comprises a front covering part 10 and a rear covering part 20, in which a disk receiving device 30 is placed. Thereby, the disk receiving device 30 is linked by a pivoting junction 52 to the rear covering part 20. The front covering part 10 and the rear covering part 20 are pivotable with respect to each other around a pivoting junction 54. The pivoting junctions 52, 54 are thereby comprised of a usual pivot bearing, as it is, for instance, used with the storage cassette of DE-A 42 25 784. The rear covering part 20 is shaped in a way to essentially completely surround the disk receiving device 30 on five sides, while the side lying upside in the drawing is locked by the front covering part 10. Centrally in disk receiving device 30 a clamping element arrangement 40 is disposed. The latter protrudes, in the closed state of the storage cassette, as well in direction of the front covering part 10 as in direction of the rear covering part 20 above the surface of the disk receiving device 30, thereby allowing to clamp one information disk to the upper side and one to the lower side, respectively, of the disk receiving device 30.

Figure 2:
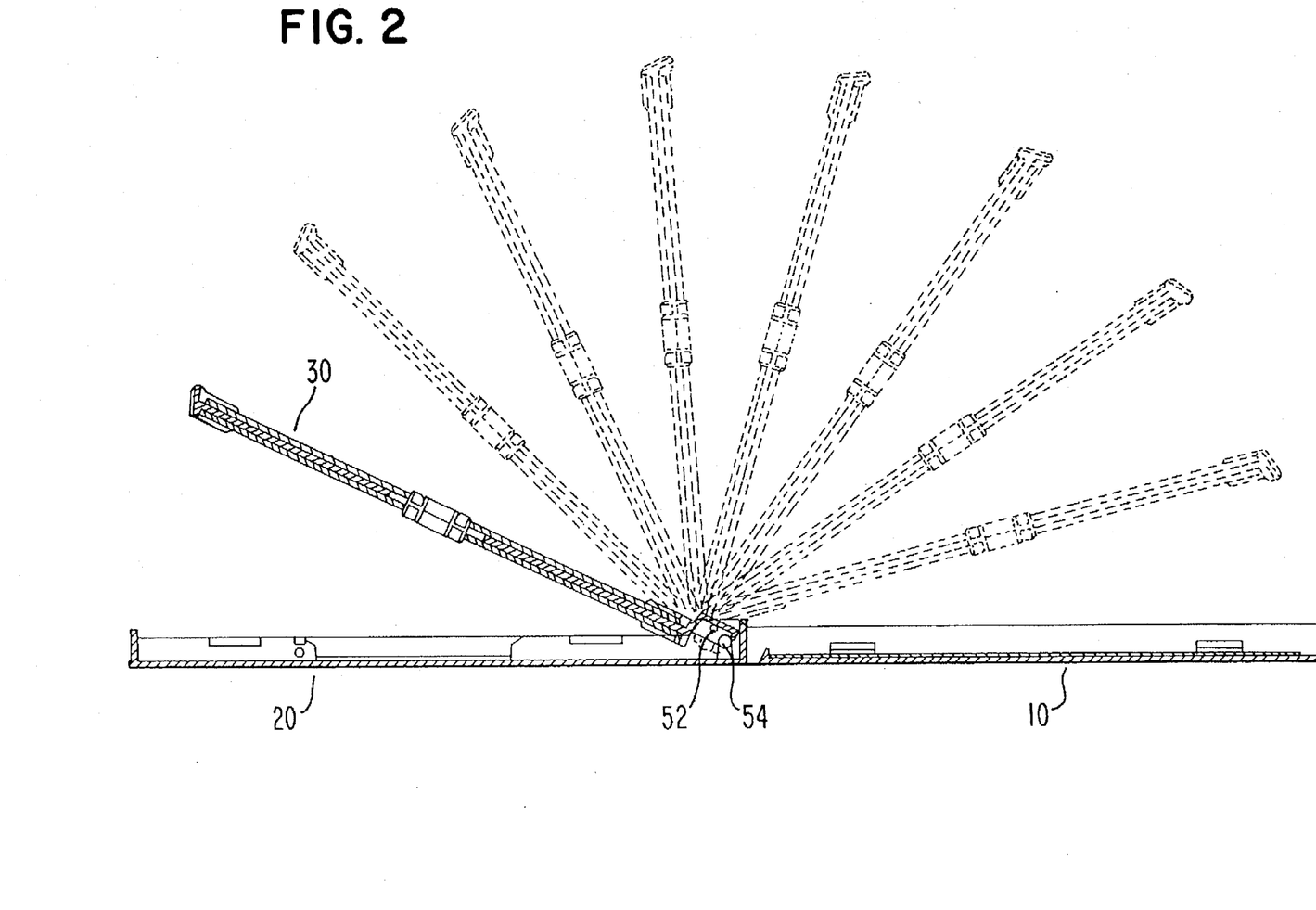
FIG. 2 is a view of different angular positions of the disk receiving device with opened storage cassette.

In FIG. 2 various pivot positions of the disk receiving device 30 are shown. It may be seen that due to the position of the pivoting junction 52 the disk receiving device 30 may be pivoted by more than 180°, so that either the one or the other of the information disks is freely accessible for the user, and the disk receiving means rests either on the rear covering part 20 or on the front covering part 10. Due to the pivoting junction 54 it is possible that in an open state of the storage cassette the front covering part 10 and the rear covering part 20 are situated in the same plane.

Figure 3:
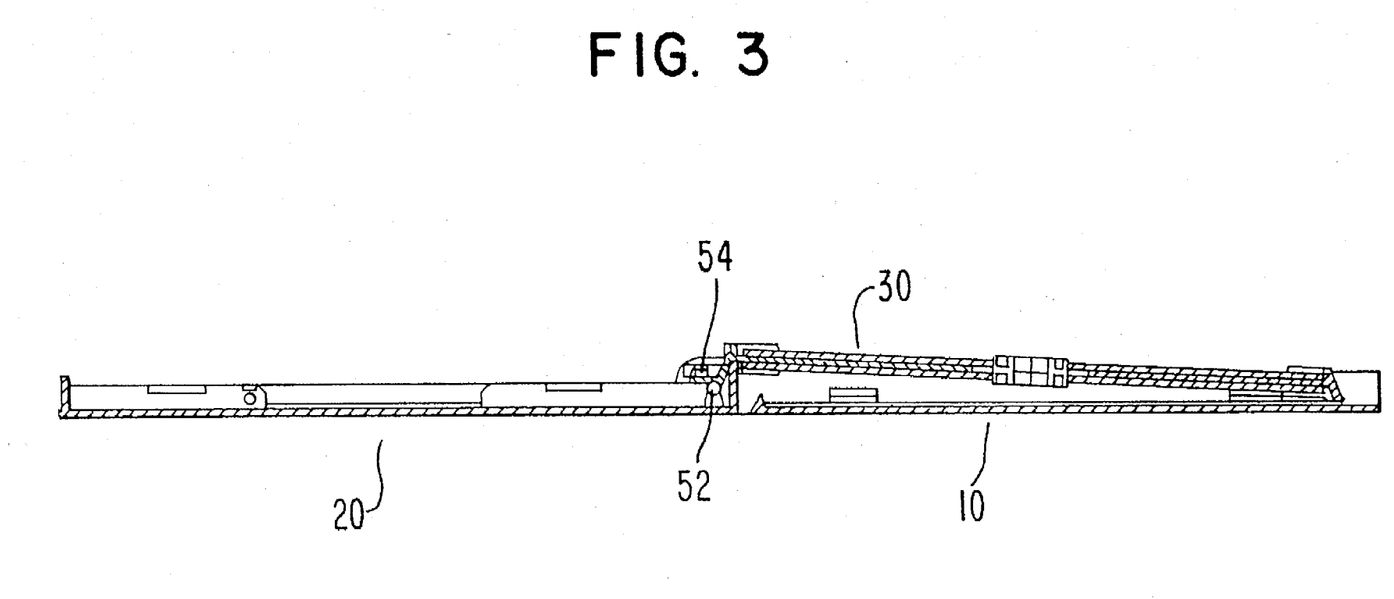
FIG. 3 is a completely opened storage cassette, the disk receiving device releasing the information disk, which is down below in a closed state.

FIG. 3 shows the opened storage cassette, the disk receiving device 30, pivoted more than 180° in relation to its rest position in the rear covering part 20, lying on the front covering part 10. Hereby the disk receiving device 30 rests on the semicircular protrusions that protrude from one side wall of the front covering part 10, thereby enabling the user to easily grasp the disk receiving device 30, since between the disk receiving device 30 and the front covering part 10 a small gap is maintained.

The arrangement of the semicircular protrusions and their purpose is also described in DE-A 42 25 784.

Figure 4:
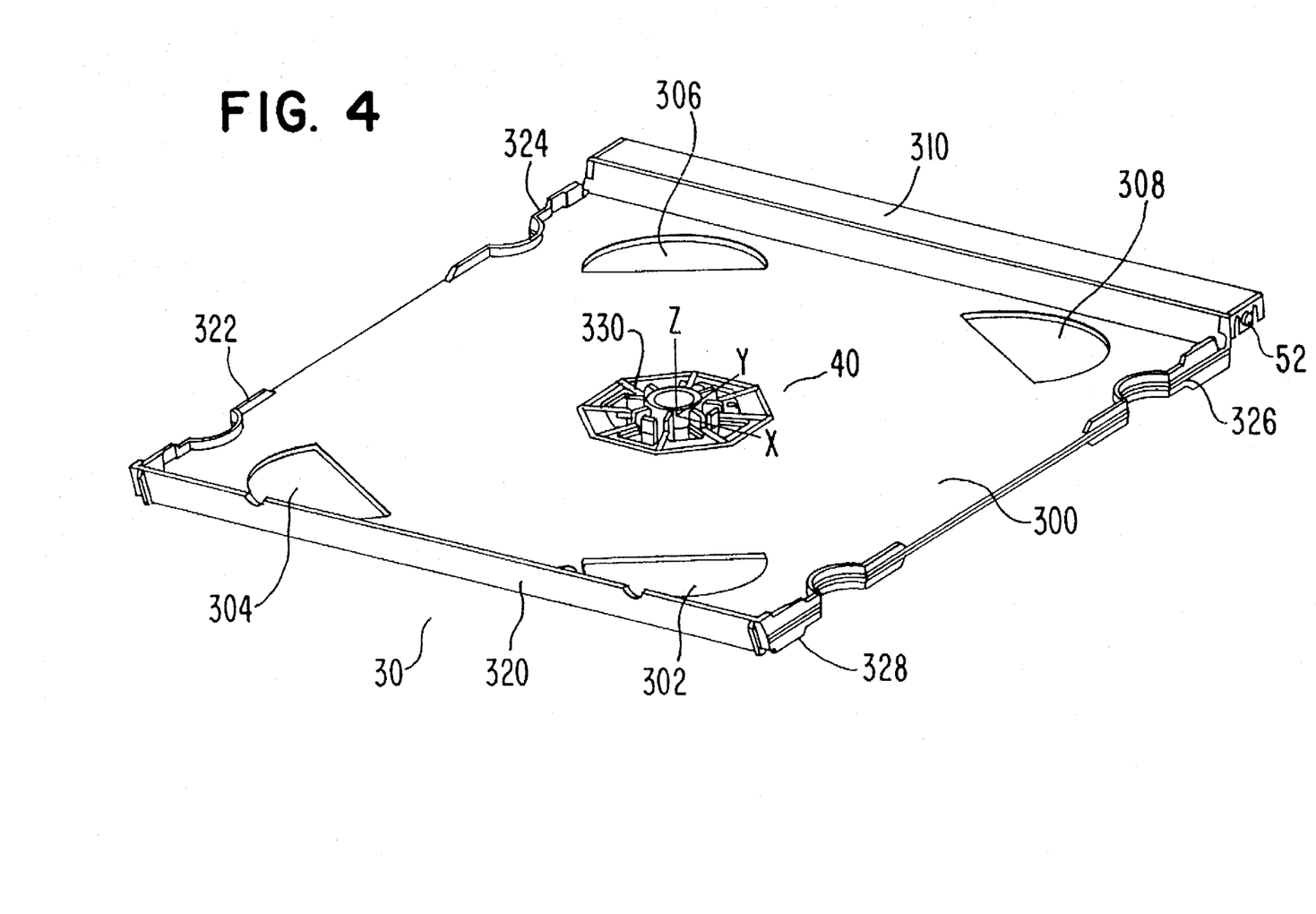
FIG. 4 is a perspective view of a disk receiving device according to the present invention.

FIG. 4 shows a perspective view of the disk receiving device 30 according to the present invention. The disk receiving device 30 comprises an essentially square base plate 300, with nearly semicircular openings 302, 304, 306, 308 formed close to each of the four corners of the base plate 300, into which the user can grasp to release an information disk from the clamping element arrangement 40. The clamping element arrangement 40 is situated in the center of the base portion 300, i.e. embedded into a central opening 330, and is in more detail described below. That side of the base plate 300 that is supposed to be pivotably linked to the lower covering part 20 (FIGS. 1 to 3), comprises a prominent shoulder 310, with the journals for the pivoting junction 52 placed at its opposite sides thereof. The base plate 300 is surrounded by marginal pieces 320, 322, 324, 326, 328, extending substantially vertically to the base plate 300, the pieces being intended to protect the information disk from squeezing, when the storage cassette is being closed. The marginal pieces 322, 324, 326, 328 that form the corner region of the base portion 300 comprise C-shaped recesses which fit into the semicircular brackets of the upper covering part when the storage cassette is closed.

Figure 5:
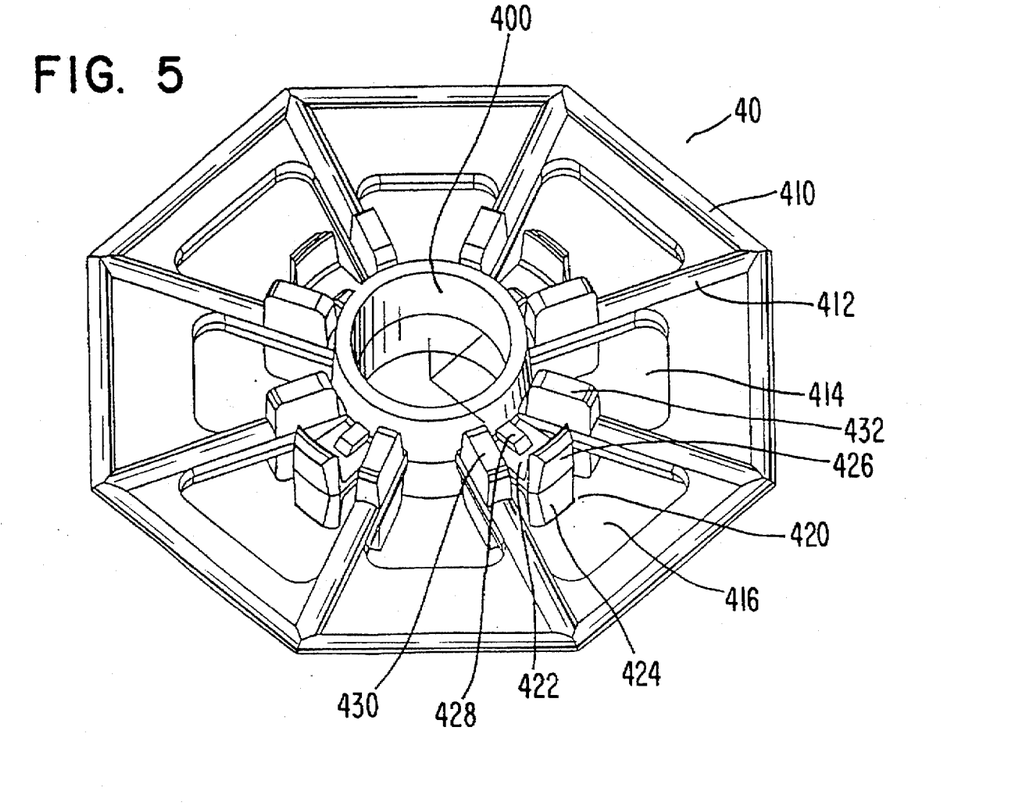
FIG. 5 is a perspective view of a clamping element arrangement of a disk receiving device.

FIG. 5 shows a perspective view of the clamping element arrangement 40 that is provided in the middle of the base plate 300 (FIG. 4) of the disk receiving device. According to the embodiment as illustrated, circumferential boundaries 410 are provided, at which a plurality of braces 412 are terminating, eight in the present case, which on the other side are fixed to a ring 400 that is arranged in the middle of the central opening of the disk receiving device. The braces 412 subdivide the central opening into eight angular segments of same size. In each angular segment a recess 414, 416 is provided which serves as a stiffening and stabilization device, respectively, of the clamping element arrangement 40. In every second angular segment a T-shaped clamping element 420 is situated, with a base portion 422 fixed to the ring 400 in a way that it extends essentially within the plane of the disk receiving device. Clamping portions 424, 428 are formed integrally with the base portion and extend off the plane of the disk receiving device, to then, in their entirety, clamp each of the information disks. The base portion 422 is provided with a reinforcing part 428 which is integral with both the base portion 422 and the ring 400. On both sides of the clamping element 420, placed on the neighbouring braces 412, ribs 430, 432 are situated, extending radially from the ring 400 and terminating ahead of the clamping parts 424, 426 of the clamping element 420. These ribs 430, 432 which are provided on both sides of the clamping arrangement, especially protect the sensitive base portion 422 from improper touching. According to the illustrated embodiment, the recesses 416 in which the clamping elements 420 are arranged are larger than the recesses 414 in which no clamping elements are provided. Such design possibilities contribute positively to the optical effect.

Figure 6:
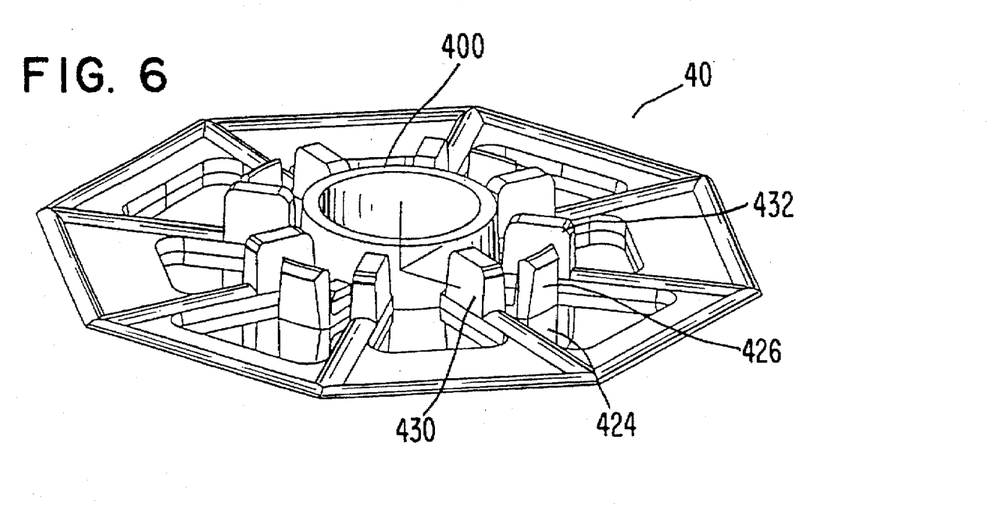
FIG. 6 is another illustration of a clamping element arrangement from another angle.

FIG. 6 shows another perspective view of the clamping element arrangement 40 from which especially can be seen that the height of the ribs 430, 432 flush with the ring 400 as well as with the clamping portions 424 and 426.

Figure 7:
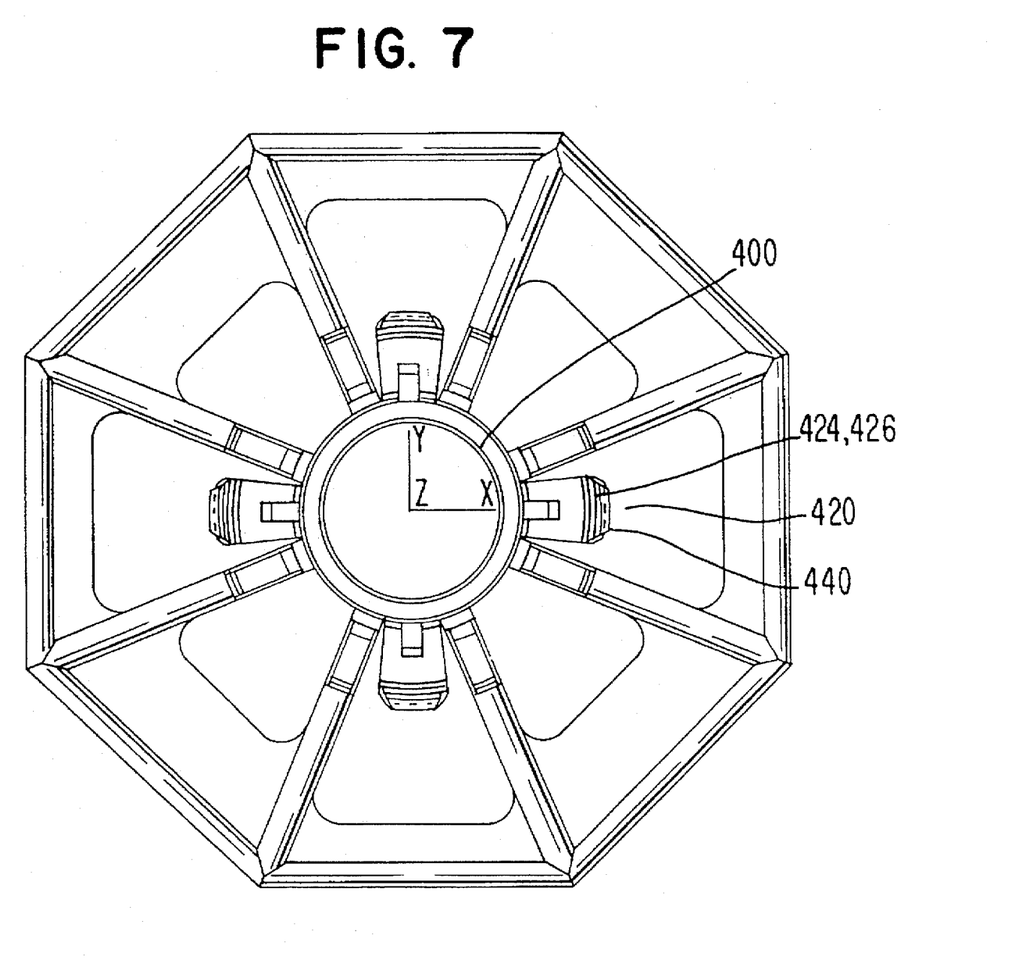
FIG. 7 is a top view of a clamping element arrangement.

FIG. 7 shows a top view of the clamping element arrangement 40. The four clamping elements 420 terminate in such a distance from the ring 400 that the clamping portions 424, 426 engage into the center hole of an information disk. Hereby, each of the clamping portions 424, 426 comprises an angular offset protrusion 440 at its free end, for increasing of the clamping effect.

Figure 8:
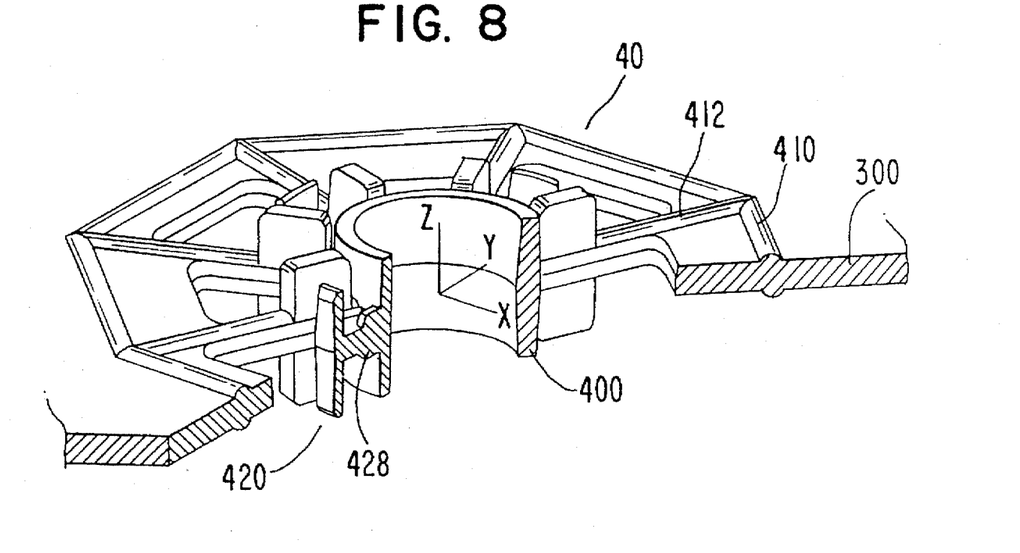
FIG. 8 is another perspective, partly sectional view, of the clamping element arrangement.

FIG. 8 shows by another perspective view, that is partly cut-off, in which way the clamping element arrangement 40 is fixed to the base plate on 300 of the disk receiving device. The circumferential edge 410 is formed by an octogonal bordering rib, that is slightly thickened with regard to the base plate 300. Due to this thickened rib 410, together with the similarly formed braces 412, a certain stiffness against torsion of the clamping element arrangement 40 in the base plate 300 is achieved. Also, it can be clearly seen that the clamping elements 420 are formed integrally with the ring 400 and are provided with reinforcing parts 428 to achieve a maximum stability of the arrangement.

Figure 9:
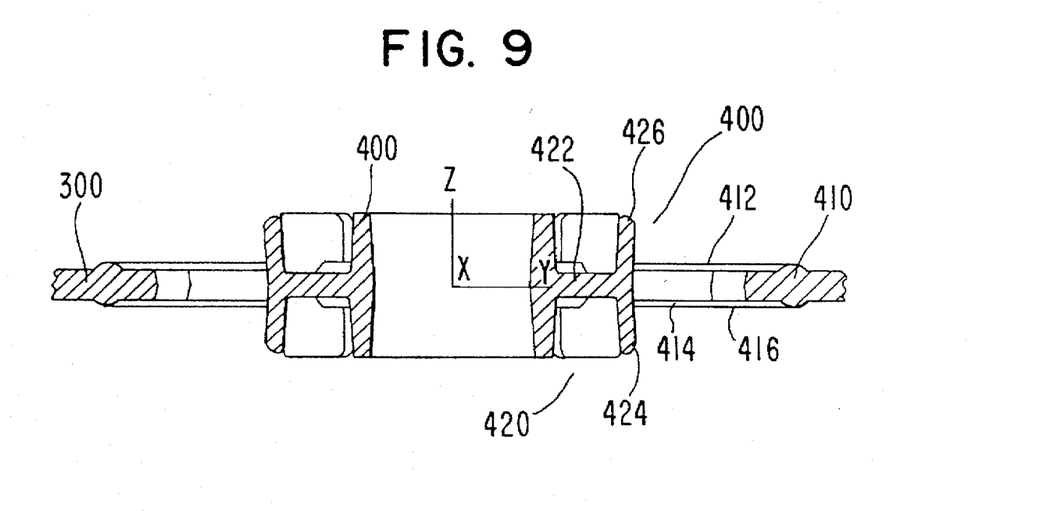
FIG. 9 is a sectional view of a clamping element arrangement in the direction of the Y-axis in FIG. 5.

Finally, FIG. 9 shows a sectional view along the Y-axis in FIG. 5. The cross section of the wall of the ring 400 thickens in direction to the middle plane of the base plate 300 of the disk receiving device in a way, that it results in a rigid linking piece for the base portion 422 of each clamping element 420. The different sizes of the recesses 414, 416 result from the requirements on stability in the middle region of the base plate 300. The clamping portions 424, 426 are slightly bent off the ring 400 and comprise angular offset protrusions 440.

Summarizingly, a disk receiving device for a storage cassette for information disks is obtained, that is not only operating reliably, but can also be designed optically attractive in various ways.

The features of the invention disclosed in the foregoing description, in the drawings and in the claims may, both separately and in any combination thereof be material for realizing the invention.

The invention being thus described, it will be obvious that the same may be varied in many ways. Such variations are not to be regarded as a departure from the spirit and scope of the invention, and all such modifications as would be obvious to one skilled in the art were intended to be included within the scope of the following claims.

I claim:

1. A disk receiving device for a storage cassette comprising a front covering part, a rear covering part and a disk receiving device, said front and rear covering parts and said device forming a storage space for circular information disks, clamping elements on both sides of said disk receiving device, the clamping elements protruding from said disk receiving device for clamping said circular information disks in a center hole of said information disks, said clamping elements being T-shaped, each clamping element having a base portion and two clamping portions integral with said base portion, said clamping elements being disposed around a central opening in said disk receiving device, said clamping elements being arranged wherein said clamping portions protrude on both sides of said disk receiving device essentially in vertical direction thereto, said clamping portions forming a cross of each T-shaped clamping element, each base portion extending radially from said central opening in a plane of said central opening, and said plane being substantially perpendicular to said vertical direction.

2. The disk receiving device according to claim 1, wherein said base portions of said clamping elements are fixed at the periphery of said central opening.

3. The disk receiving device according to claim 1, further comprising a ring provided within said central opening, at which the base portions of the clamping elements are fixed.

4. The disk receiving device according to claim 1, wherein on at least one side of each clamping element, a rib is provided which extends radially with respect to said central opening along one of said base portions and terminates in front of said clamping portions.

5. The disk receiving device according to claim 4, wherein on both sides of said base portions of each clamping element, a respective rib is provided on both sides of said disk receiving device.

6. The disk receiving device as claimed in claim 1, further comprising a ring centered within said central opening and fixed at the circumference of said central opening via a plurality of braces.

7. The disk receiving device as claimed in claim 1, wherein said clamping portions of said clamping elements comprise at their free ends angular offset protrusions for holding said information disks.

8. A disk receiving device for a storage cassette comprising a front covering part, a rear covering part and a disk receiving device, said front and rear covering parts and said plate forming a storage space for circular information disks, clamping elements on both sides of said disk receiving device, the clamping elements being T-shaped and protruding from said disk receiving device, for clamping said circular information disks in a center hole of said information disks and being disposed around a central opening in said disk receiving device, each clamping element having a base portion and two clamping portions integral with said base portion and extending vertically from said base portion in such a manner that said clamping portions protrude on both sides of said disk receiving device essentially in vertical direction thereto, said clamping portions forming a cross of each T-shaped clamping element, each base portion extending radially from said central opening in a plane of said central opening, said plane being substantially perpendicular to said vertical direction, and on at least one side of the T-shaped clamping elements, ribs being provided which extend radially with respect to said central opening along said base portion and terminate in front of said clamping portions.

9. The disk receiving device according to claim 8, wherein said base portions of said clamping elements are fixed at the periphery of said central opening.

10. The disk receiving device according the claim 8, further comprising a ring provided within said central opening, at which the base portions of the clamping elements are fixed.

11. The disk receiving device according to claim 8, wherein on both sides of each base portion of each clamping element of the disk receiving device, a respective reinforcing part is provided.

12. The disk receiving device as claimed in claim 8, further comprising a ring centered within said central opening and fixed at the circumference of said central opening via a plurality of braces.

13. The disk receiving device as claimed in claim 8, wherein said clamping portions of said clamping elements comprise at their free ends angular offset protrusions for holding said information disks.

* * * * *